UNITED STATES PATENT OFFICE.

NATHANIEL C. FOWLER, JR., OF BOSTON, MASSACHUSETTS.

FRUITED FLOUR AND METHOD OF PREPARATION.

1,182,264.  Specification of Letters Patent.  Patented May 9, 1916.

No Drawing.   Application filed September 17, 1915.   Serial No. 51,272.

*To all whom it may concern:*

Be it known that I, NATHANIEL C. FOWLER, Jr., a citizen of the United States, residing at Boston, in the county of Suffolk and State of Massachusetts, have invented new and useful Improvements in Fruited Flours and Methods of Preparation, of which the following is a specification.

This invention relates to improvements in flour and in methods of making the same. More particularly it relates to fruited flour.

It is an object of the invention to provide a flour having a fruit component embodied in such a way that the product is capable of treatment with yeast, and of being baked or otherwise treated by a cooking process with results comparable to those obtained by like treatment of ordinary flour.

According to the invention the finished product has its fruit component distributed uniformly throughout it in such a way as to be practically invisible. The presence of the fruit may perhaps be distinguishable by the darker aspect which the product has, according to the particular fruit that is embodied, and is of course distinguishable microscopically; but the finished product has the general aspect of flour or meal and has the general qualities of the same, and nevertheless has in addition the qualities of the fruit coupled therewith, and has these fruit qualities in more digestible form than if the fruit had been used whole.

It is a further purpose of the invention to make a flour from which bread may be made, as fluffy and as light as when bread is made from flour without a fruit component, and in other respects resembling such bread.

In the present specification the term "flour" is used in a broad sense as typical of meal and the ground cereal products in general, such as bran, "whole" or "entire wheat" flour, rye, wheat, corn meal, etc., or combinations of these.

In the practice of the invention various components may be used for the flour element and various components for the fruit element. I set forth herein the process which I consider best, but this is purely illustrative and the patent is not to be considered as limited to the specific ingredients and manner of performing the process herein defined; because the same may be altered in various ways without departing from the scope of the invention as defined by the appended claims. It is intended by suitable expression in the appended claims to cover whatever features of patentable novelty are herein disclosed.

In practising the invention the procedure which I at present deem best is to place ordinary raisins, or other suitable fruit in a desiccator or other machine for extracting moisture therefrom. When the moisture has been very largely removed the fruit should be ground. In the grinding operation, flour, or any of the various ground cereal products typified thereby or any combination of them may be mixed with it.

Although I do not deem it essential, the presence of flour in connection with the fruit in the grinding machine somewhat facilitates the grinding action on the fruit; and for this purpose I may put in about equal parts of fruit and flour. The grinding preferably is carried on until the fruit is ground very fine. After the grinding more of the flour should be added; and the whole should be mixed thoroughly so that the fruit is disseminated throughout the whole mass. The product thus formed does not differ much in appearance from ordinary flour; and it may be treated like ordinary flour in making bread or other food products. In particular if ordinary white wheat flour be used in connection with the fruit, or if so-called whole wheat flour be used or a mixture of either or these with corn meal, dough can be made in the usual way with yeast, and kneaded and allowed to rise and baked, with a resulting bread which looks like ordinary bakers' bread made from the same components except as the fruit component may somewhat affect its color. In such a bread there may be a combination of ground cereal products, such as some bran and some wheat flour, with the fruit; and other combinations may be made at will or other cereal products not mentioned herein may be used in like manner; and other products than bread may be made by the customary processes of cooking. Yeast may be used or self-rising flour or baking powder or other customary cooking ingredients which act upon flour to make it light; and in so acting the fruit ingredient is lifted and sustained in position wherever it is, in its small particles, throughout the loaf. The product when properly handled, by methods known by cooks or bakers of ordinary skill, is light and fluffy like ordinary good bread, At the same time the product contains the fruit flavor and qualities. In the finished product the proportions of fruit and cereal flour may vary considerably; but it is important that there be not too much of the fruit. For example, I prefer not to have the fruit more than one-fourth of the whole; and at the same time, in order to get a satisfactory fruit flavor, I prefer to have the fruit as much as one-seventh or one-eighth of the whole. If there be a proportion of fruit much larger than the maximum mentioned, difficulty may be experienced in having the dough rise and bake properly into sweet, fresh loaves. Assuming the there is a large enough proportion of flour of one sort, or of various sorts, to satisfy these requirements, the mixture that is made into dough for the bread may have varying proportions of fruit; and the ratio of fruit may obviously be varied considerably according to the particular fruit which is used and according to the taste or result which is desired. If preferred the flour may be marketed without the full proportion of ground cereal which is to be used when it is employed in the preparation of food, the consumer adding such kind and quality of flour as he or she may desire in order to make up the necessary or the desired proportion.

In the foregoing I have described the process which I consider best for making the flour on a commercial scale; but the idea of the invention can be carried out in a more simple and domestic way with results which approximate those obtained by the above method although not retaining quite so much of the fruit flavor. In this modification of the process I take one part of fruit, such as ordinary prunes or raisins and mix the same with one part or more of any suitable ground cereal such as bran, whole wheat flour, Indian meal or white wheat flour, or any suitable combination of ground cereals. The compound thus formed I put through an ordinary domestic meat chopper or mincer twice, and then I put it once through a meat chopper or mincer which delivers its product by exudation through holes in filamentary form resembling spaghetti. The execution of this step mixes the fruit and the flour together fairly well, and in the course of it the fruit practically disappears from view so far as general appearance is concerned, the product being however darkened somewhat by the presence of the fruit in it. As the combination thus formed may be somewhat damp on account of moisture contained in the fruit therein, it should be subjected to dry heat. That heat should not be enough to roast or cook the material, but merely to dry it. It may however, be high enough, and long enough continued to sterilize the product, so that it will keep for a long time.

The presence of the ground cereal during the grinding and the drying saves more or less of the flavor by absorption, which might otherwise be lost. After the drying it may be ground into a fine powder by any suitable grinding machine, in which case the flour reverts to its original state of fineness and the fruit to its fineness according to the degree to which they each have been ground. This product may then be mixed with three, four or five parts of the same kind of flour, or whatever proportion is desired, or with whatever other ground cereal is desired, by hand or otherwise, and the resultant product is ready for use by the cook or baker. In making bread, the treatment is similar to that employed with ordinary flour. I do not deem this form of the process quite as good as that first described because the drying by heat removes some of the flavor of the fruit; but the body of the fruit material remains, and sufficient of the flavor remains to be agreeable to the taste and beneficial as a food, and the bread produced is satisfactory as a bread product.

While bread has been particularly mentioned herein as the ultimate product, because it is most difficult to make with a fruit composition, it will be understood that the fruited flour of the invention can be put to any uses, generally speaking, to which ordinary flours or ground cereal products are put.

By the use of the invention it is possible to introduce fruit into a dietary in the manifold ways in which flour and meal are used, especially with the aid of yeast, baking powder, or their equivalents, and with the great advantages that would follow the use of fruit upon a more extensive scale than is now customary with the people at large. For a specific formula which is likely to receive public commendation as wholesome and beneficial for that purpose, I mention the following as an illustration: raisins, one part; bran or whole wheat flour, one part; white wheat flour, five parts; a mixture being first prepared containing all of the raisins and part of the flour as above described, and the remainder of the flour being afterward added and thoroughly mixed in, either before sale to the public or by the consumer who has purchased the original mixture.

I claim as my invention:

1. A process of making a fruited flour comprising the mixture of pulverized, desiccated fruit with ground cereal, there being a sufficient proportion of the cereal in the mass to impart the general characteristics of the cereal to the mass as a whole.

2. A process of making a fruited flour comprising the mixture of pulverized, desiccated raisins with ground products of wheat, there being a sufficient proportion of the ground wheat product in the mass to render the product responsive to action of yeast.

3. A process of making fruited flour comprising the grinding of dried fruit, with a moderate portion of previously ground cereal, and the subsequent addition of ground cereal sufficient in proportion to give to the product the general characteristics of a mass of ground cereal.

4. A process of making a fruited flour comprising the grinding of dried fruit in the presence of previously ground cereal, and the further drying of the product of this grinding by heat without cooking.

5. A process of making a fruited flour comprising the grinding of dried fruit in the presence of previously ground cereal, and the further drying of the product of this grinding by heat without cooking, and the addition of sufficient ground cereal to give to the mixed product the general characteristics of ground cereal.

6. A fruited flour including a mixture of pulverized, desiccated fruit the insoluble solids of which are retained and sufficient ground cereal to give the mass the general characteristics of the ground cereal.

7. A fruited flour including a mixture of pulverized, desiccated fruit and ground cereal, both being uncooked and the fruit being sterilized, and there being sufficient of the ground cereal to give its own general characteristics to the mass.

8. A food product in the form of flour, including pulverized residue of raisins remaining after separation of moisture therefrom by evaporation, and ground cereal.

9. A fruited flour comprising a mixture including pulverized, desiccated fruit the insoluble solids of which are retained and at least as much as approximately an equal part of ground cereal, the whole being in the form of flour.

Signed by me at Boston, Mass., this fifteenth day of September, 1915.

NATHANIEL C. FOWLER, Jr.

Witnesses:
EVERETT E. KENT,
ANNA B. LINDSAY.